United States Patent
Luan et al.

(10) Patent No.: US 10,248,163 B2
(45) Date of Patent: Apr. 2, 2019

(54) FLEXIBLE DISPLAY APPARATUS

(71) Applicant: E Ink Holdings Inc., Hsinchu (TW)

(72) Inventors: Ta-Nien Luan, Hsinchu (TW);
Yen-Fong Liao, Hsinchu (TW);
Kuan-Lin Huang, Hsinchu (TW);
Chen-Yuan Sung, Hsinchu (TW);
Chiang-Ling Tseng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 406 days.

(21) Appl. No.: 14/514,410

(22) Filed: Oct. 15, 2014

(65) Prior Publication Data
US 2015/0146388 A1    May 28, 2015

(30) Foreign Application Priority Data
Nov. 28, 2013  (TW) .............................. 102143478 A

(51) Int. Cl.
*G06F 1/16*    (2006.01)
*B32B 38/10*   (2006.01)
*G02F 1/167*   (2019.01)
*B32B 38/00*   (2006.01)

(52) U.S. Cl.
CPC ............ *G06F 1/1652* (2013.01); *B32B 38/00* (2013.01); *B32B 38/10* (2013.01); *G02F 1/167* (2013.01); *Y10T 428/10* (2015.01); *Y10T 428/1036* (2015.01)

(58) Field of Classification Search
CPC combination set(s) only.
See application file for complete search history.

(56) References Cited

U.S. PATENT DOCUMENTS

2002/0149572 A1*  10/2002  Schulz .................... G06F 3/044
                                                              345/174
2006/0055320 A1    3/2006  Lee
2006/0291034 A1   12/2006  Patry et al.
(Continued)

FOREIGN PATENT DOCUMENTS

CN    102540555    7/2012
CN    103246121    8/2013
(Continued)

OTHER PUBLICATIONS

"Office Action of China Counterpart Application", dated Dec. 14, 2016, p. 1-p. 7, in which the listed references were cited.

*Primary Examiner* — Anthony J Frost
(74) *Attorney, Agent, or Firm* — JCIPRNET

(57) ABSTRACT

A flexible display apparatus includes a flexible display unit, a flexible film and a molding compound. The flexible display unit has a first region and a second region surrounding the first region, and the flexible film is disposed on the flexible display unit and at least located within the first region. The flexible film has a circumferential surface and at least one accommodating groove, the accommodating groove is sunken from the circumferential surface, and the flexible film exposes the second region of the flexible display unit. The molding compound is disposed on the flexible display unit, covers the circumferential surface and the second region exposed by the flexible film and fills the accommodating groove. A thickness of the molding compound filling the accommodating groove is the same as the thickness of the flexible film.

9 Claims, 4 Drawing Sheets

(56) References Cited

U.S. PATENT DOCUMENTS

| | | | | |
|---|---|---|---|---|
| 2007/0297747 | A1* | 12/2007 | Biernath | G02B 5/3083 385/147 |
| 2010/0201613 | A1* | 8/2010 | Kamada | G02B 6/009 345/102 |
| 2011/0001146 | A1* | 1/2011 | Yamazaki | H05B 33/04 257/79 |
| 2012/0212797 | A1* | 8/2012 | Luan | G02F 1/167 359/296 |
| 2013/0169515 | A1* | 7/2013 | Prushinskiy | G06F 1/1652 345/55 |
| 2013/0222998 | A1* | 8/2013 | Cho | G06F 1/1601 361/679.27 |

FOREIGN PATENT DOCUMENTS

| | | |
|---|---|---|
| TW | 201227134 | 7/2012 |
| TW | I409732 | 9/2013 |

* cited by examiner

FLEXIBLE DISPLAY APPARATUS

CROSS-REFERENCE TO RELATED APPLICATION

This application claims the priority benefit of Taiwan application serial no. 102143478, filed on Nov. 28, 2013. The entirety of the above-mentioned patent application is hereby incorporated by reference herein and made a part of this specification.

BACKGROUND OF THE INVENTION

Field of the Invention

The present invention generally relates to a display apparatus, and more particularly, to a flexible display apparatus.

Description of Related Art

In recent years, a variety of display technologies continue to flourish. After a sustained research and development, many display products such as electrophoretic displays, liquid crystal displays, plasma displays, organic light-emitting diode display have been commercialized and applied gradually in the display apparatuses of various sizes and various areas. With the growing popularity of portable electronic products, flexible displays (such as e-paper, e-book and so on) have been gaining market attention.

Generally, in order to prevent environmental factors (such as moisture, oxygen, etc.) from affecting the component and material properties of a display apparatus, typically, an encapsulant with fluidity flexible is employed to seal the flexible display apparatus and a protective film thereon with rectangular shape profile. However, when the flexible display apparatus is bent into different structures with curved surface, three-dimensional shape, regular plan or non-planar surface (e.g., the inclined surface), due to gravity, the encapsulant with fluidity would flow to the lowest place after bending and deposit at the lowest place, which makes the encapsulation colloid too much to overflow to a surface of the protective film relatively far away from the flexible display apparatus and to the circumferential surface of the flexible display apparatus and further affect the appearance and the flatness of the flexible display apparatus.

SUMMARY OF THE INVENTION

Accordingly, the present invention is directed to a flexible display apparatus, wherein the flexible film of the flexible display apparatus includes at least one accommodating groove by design so as to effectively avoid the overflow of molding compound of the flexible display apparatus in the prior art and make the appearance thereof more flat and nice look.

The invention provides a flexible display apparatus, which includes a flexible display unit, a flexible film and a molding compound. The flexible display unit has a first region and a second region surrounding the first region, and the flexible film is disposed on the flexible display unit and at least located within the first region, wherein the flexible film has a circumferential surface and at least one accommodating groove, the accommodating groove is sunken from the circumferential surface, and the flexible film exposes the second region of the flexible display unit. The molding compound is disposed on the flexible display unit, covers the circumferential surface of the flexible film and the second region of the flexible display unit exposed by the flexible film and fills the accommodating groove, in which the thickness of the molding compound filling the accommodating groove is the same as the thickness of the flexible film.

In an embodiment of the present invention, the material of the above-mentioned flexible film includes glass, plastic or metal.

In an embodiment of the present invention, cross-section of the above-mentioned accommodating groove includes polygonal shape or arc shape.

In an embodiment of the present invention, the viscosity coefficient of the above-mentioned molding compound is positive proportional to the depth of the accommodating groove.

In an embodiment of the present invention, the ratio of the area of the above-mentioned accommodating groove over the area of the flexible film ranges roughly from greater than 0 to less than or equal to 0.1.

In an embodiment of the present invention, the number of the at least one accommodating groove is two, and the accommodating grooves are disposed correspondingly to a bending place of the flexible display apparatus and are opposite to each other.

In an embodiment of the present invention, the number of the at least one accommodating groove is multiple, the accommodating grooves are located at two opposite side edges of the flexible film and the orthographic projections of the accommodating grooves on an axis are alternately arranged.

In an embodiment of the present invention, the number of the at least one accommodating groove is multiple, and the accommodating grooves are located at two opposite side edges of the flexible film and the orthographic projections of the accommodating grooves on an axis are at least partially overlapped with each other.

In an embodiment of the present invention, the outer profile of the above-mentioned molding compound is a ring-shaped curved-surface profile, and the molding compound entirely exposes an upper surface of the flexible film relatively far away from the flexible display unit and a circumferential surface of the flexible display unit.

In an embodiment of the present invention, the above-mentioned flexible display unit includes a flexible liquid crystal display, a flexible electrophoretic display or a flexible organic electroluminescent display.

Based on the depiction above, the flexible film of the flexible display apparatus in the invention has the accommodating groove by design, so that the molding compound only covers the circumferential surface of the flexible film and the second region exposed by the flexible film, and the molding compound can fill the accommodating groove without overflowing on the upper surface of the flexible film and the circumferential surface of the flexible display unit. In other words, the flexible display apparatus of the invention can effectively avoid the overflow of molding compound by the molding compound and make the appearance thereof more flat and nice look.

Several exemplary embodiments accompanied with figures are described in detail below to further describe the invention in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the invention.

DESCRIPTION OF THE EMBODIMENTS

Figure 1A:
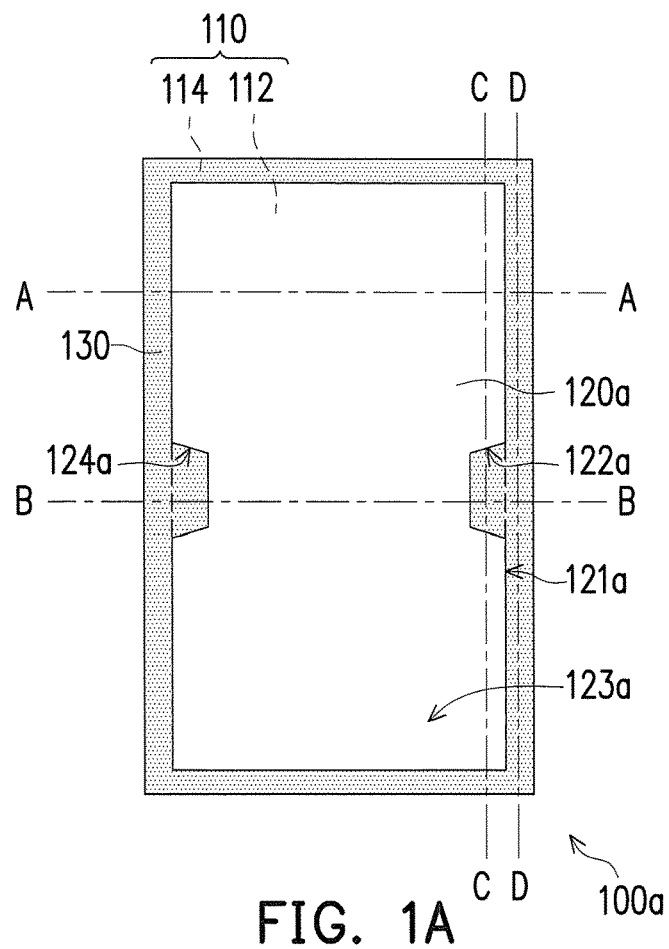
FIG. 1A is a bottom-view diagram of a flexible display apparatus according to one exemplary embodiment of the present invention.
Figure 1B:
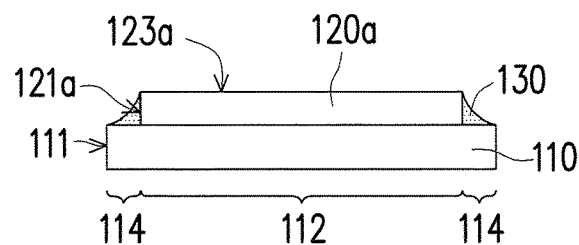
FIG. 1B is a cross-sectional diagram of the flexible display apparatus in FIG. 1A along line A-A.
Figure 1C:
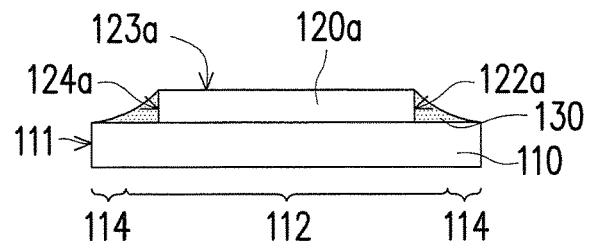
FIG. 1C is a cross-sectional diagram of the flexible display apparatus in FIG. 1A along line B-B.
Figure 1D:
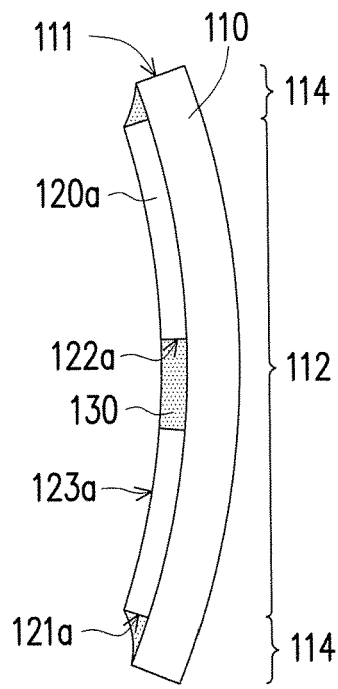
FIG. 1D is a cross-sectional diagram of the flexible display apparatus in FIG. 1A along line C-C.
Figure 1E:
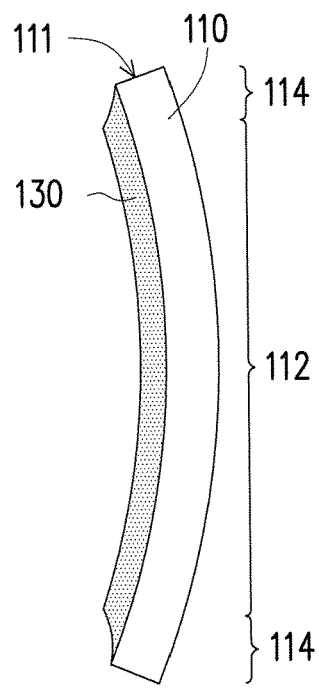
FIG. 1E is a cross-sectional diagram of the flexible display apparatus in FIG. 1A along line D-D.

FIG. 1A is a bottom-view diagram of a flexible display apparatus according to an embodiment of the present invention, FIG. 1B is a cross-sectional diagram of the flexible display apparatus in FIG. 1A along line A-A, FIG. 1C is a cross-sectional diagram of the flexible display apparatus in FIG. 1A along line B-B, FIG. 1D is a cross-sectional diagram of the flexible display apparatus in FIG. 1A along line C-C and FIG. 1E is a cross-sectional diagram of the flexible display apparatus in FIG. 1A along line D-D. Referring to FIGS. 1A-1E, the flexible display apparatus 100a of the embodiment includes a flexible display unit 110, a flexible film 120a and a molding compound 130.

In more details, the flexible display unit 110 has a first region 112 and a second region 114 surrounding the first region 112. The flexible film 120a is disposed on the flexible display unit 110 and at least located within the first region 112. The flexible film 120a has a circumferential surface 121a and at least one accommodating groove (in FIG. 1A, two accommodating grooves 122a and 124a are given), in which the accommodating grooves 122a and 124a are sunken from the circumferential surface 121a and the flexible film 120a exposes the second region 114 of the flexible display unit 110. The molding compound 130 is disposed on the flexible display unit 110 and covers the circumferential surface 121a of the flexible film 120a and the second region 114 of the flexible display unit 110 exposed by the flexible film 120a, and the molding compound 130 fills the accommodating grooves 122a and 124a. The thickness of the molding compound 130 filling the accommodating grooves 122a and 124a is the same as the thickness of the flexible film 120a.

Specifically, the flexible display unit 110 can be bent and flexible, and the flexible display unit 110 is, for example, a flexible liquid crystal display, a flexible electrophoretic display or a flexible organic electroluminescent display, which the present invention is not limited to. The first region 112 and the second region 114 of the flexible display unit 110 can be, for example, respectively a display region and a peripheral region, i.e., the flexible film 120a can be disposed on the display surface of the flexible display unit 110; or, the first region 112 and the second region 114 of the flexible display unit 110 can be, for example, respectively an region disposed correspondingly to the display region and the peripheral region, i.e., the flexible film 120a can be disposed on the rear surface of the flexible display unit 110. All these belong to the scheme adopted by the invention without departing from the scope or spirit of the invention.

Furthermore, the flexible film 120a of the embodiment has also bent and flexible feature and the material thereof is, for example, thin glass, plastic or metal. The flexible film 120a serves as a protective film to protect the surfaces (for example, the display surface or the rear surface) of the flexible display unit 110. As shown by FIG. 1A, the size of the flexible film 120a in the embodiment is smaller than the size of the flexible display unit 110, and the outer profile of the flexible film 120a is not a regular shape (for example, not a rectangular shape). Referring to FIGS. 1A and 1D, the accommodating grooves 122a and 124a of the embodiment are opposite to each other, and preferably, 122a and 124a are disposed correspondingly to a bending place of the flexible display apparatus 100a, i.e., disposed at a relatively-low place after bending. It should be noted that the bending place of the embodiment is not limited to the symmetrical bending or one bending place, and it can also be asymmetrical bending or multiple bending places. The accommodating grooves 122a and 124a are preferably disposed correspondingly to the bending place/bending places to ensure the molding compound 130, due to the gravity thereof, can flow towards the lowest places after bending into the accommodating grooves 122a and 124a so as to avoid overflow of molding compound. In addition, the cross-section of the accommodating grooves 122a and 124a of the embodiment has a polygonal shape, for example, a trapezoidal shape, which the present invention is not limited to.

In particular, the ratio of the area of the accommodating groove 122a and 124a over the area of the whole flexible film 120a has a range roughly greater than 0 and less than or equal to 0.1 so that, due to gravity, the flowing molding compound 130 would completely fill the accommodating grooves 122a and 124a to avoid overflow of molding compound. In an embodiment, the ratio of the area of the accommodating groove 122a and 124a over the area of the whole flexible film 120a is roughly 0.05. Specifically, the viscosity coefficient of the molding compound 130 in the embodiment is proportional to the depth of the accommodating groove 122a (or 124a), which means, higher the viscosity coefficient of the adopted molding compound 130, the deeper the required depth of the accommodating groove 122a (or 124a) is, and at the time, the extent for the accommodating groove 122a (or 124a) to be sunken from the circumferential surface 121a is greater. As shown by FIGS. 1B, 1C and 1D, the outer profile of the molding compound 130 in the embodiment can be embodied with a ring-shaped curved-surface profile, such as a ring-shaped concave curved-surface profile. The molding compound 130 completely exposes an upper surface 123a of the flexible film 120a relatively far away from the flexible display unit 110 and a circumferential surface 111 of the flexible display unit 110. Namely, the molding compound 130 does not cover the upper surface 123a of the flexible film 120a and the circumferential surface 111 of the flexible display unit 110 at all and there is no overflow of molding compound.

Since the flexible film 120a has accommodating grooves 122a and 124a by design in the embodiment, so that the flowing molding compound 130, due to gravity, would fill the accommodating grooves 122a and 124a, and the thickness of the molding compound 130 filling the accommodating grooves 122a and 124a is substantially the same as the thickness of the flexible film 120a. That is, the molding compound 130 of the embodiment only covers the circumferential surface 121a of the flexible film 120a and a second region 114 of the flexible display unit 110 exposed by the flexible film 120a and fills the accommodating grooves 122a and 124a without overflowing of molding compound onto the upper surface 123a of the flexible film 120a and the circumferential surface 111 of the flexible display unit 110. As a result, the flexible display apparatus 100a in the embodiment can, through the design of having the accommodating grooves 122a and 124a with the flexible film 120a, effectively avoid overflow of molding compound of the molding compound 130 due to gravity, and thus, the appearance of the flexible display apparatus 100a of the embodiment is more flat and nice look.

It should be noted that in the following embodiments, wherever possible, the same reference numbers are used in the drawings and the description to refer to the same or like parts. The omitted content can refer to the foregoing embodiment and is not duplicated herein.

Figure 2:
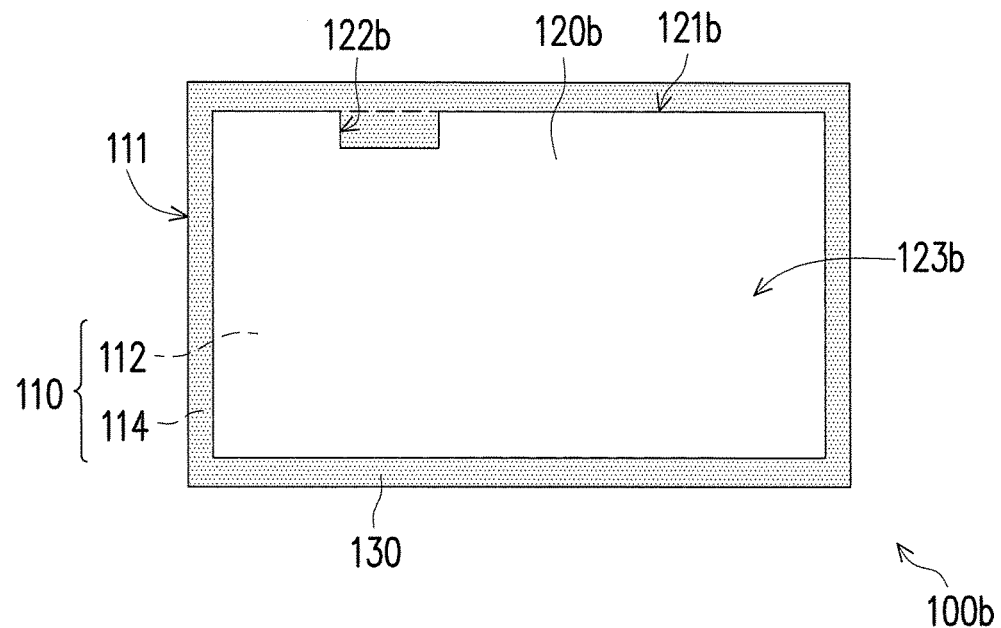
FIG. 2 is a bottom-view diagram of a flexible display apparatus according to another exemplary embodiment of the present invention.

FIG. 2 is a bottom-view diagram of a flexible display apparatus according to another exemplary embodiment of the present invention. Referring to FIGS. 1A and 2, the flexible display apparatus 100b is similar to the flexible display apparatus 100a in FIG. 1A except that the flexible film 120b of the embodiment has one accommodating groove 122b only, in which the cross-section of the accommodating groove 122b of the embodiment has a polygonal shape, for example, a rectangular shape and the accommodating groove 122b is sunken from the circumferential surface 121b. In the flexible display apparatus 100b can be bent into different types, due to gravity, the molding compound 130 with fluidity would fill the accommodating groove 122b so as to avoid overflow of molding compound onto the upper surface 123b of the flexible film 120b and the circumferential surface 111 of the flexible display unit 111.

Figure 3:
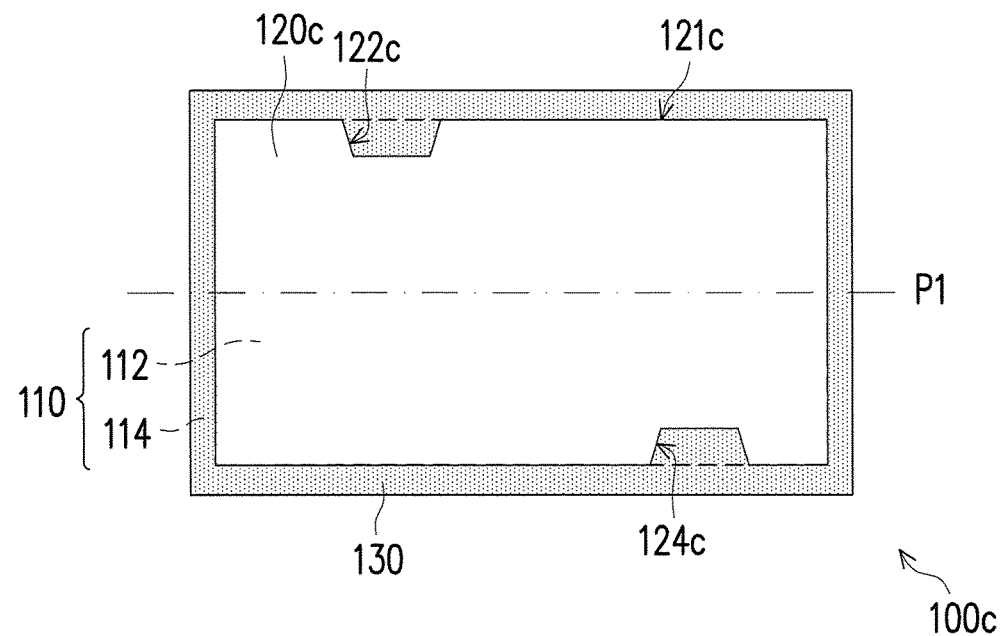
FIG. 3 is a bottom-view diagram of another flexible display apparatus according to another exemplary embodiment of the present invention.

FIG. 3 is a bottom-view diagram of another flexible display apparatus according to another exemplary embodiment of the present invention. Referring to FIGS. 1A and 3, the flexible display apparatus 100c of the embodiment is similar to the flexible display apparatus 100a in FIG. 1A except that the flexible film 120c of the embodiment has multiple accommodating grooves, for example, two accommodating grooves 122c and 124c, in which the accommodating grooves 122c and 124c are located at two opposite side edges of the flexible film 120c and sunken from the circumferential surface 121c. As shown in FIG. 3, the orthographic projections of the accommodating grooves 122c and 124c on an axis P1 are alternately arranged and the cross-sectional shape of the accommodating grooves 122c or 124c is a polygon, such as trapezoid.

Figure 4:
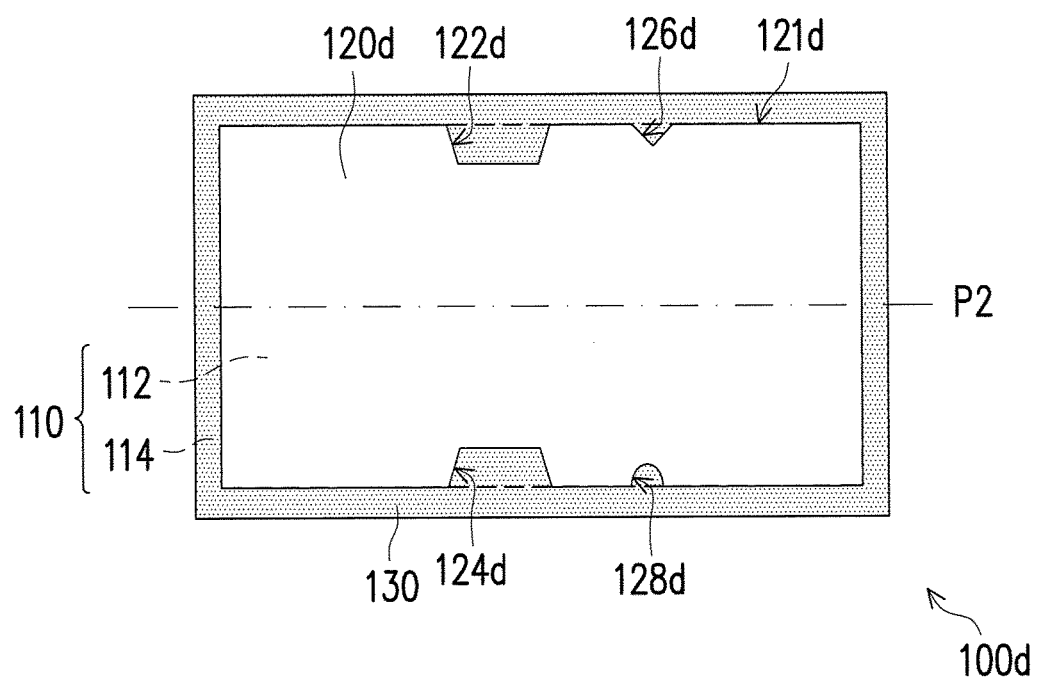
FIG. 4 is a bottom-view diagram of yet another flexible display apparatus according to another exemplary embodiment of the present invention.

FIG. 4 is a bottom-view diagram of yet another flexible display apparatus according to another exemplary embodiment of the present invention. The flexible display apparatus 100d of the embodiment is similar to the flexible display apparatus 100a in FIG. 1A except that the flexible film 120d of the embodiment has multiple accommodating grooves, for example, four accommodating grooves 122d, 124d, 126d and 128d, in which the accommodating grooves 122d, 124d, 126d and 128d are located at two opposite side edges of the flexible film 120d and sunken from the circumferential surface 121d. The orthographic projections of the accommodating grooves 122c, 124d, 126d and 128d on an axis P2 are at least partially overlapped with each other. As shown in FIG. 4, the cross-sectional shape of the accommodating grooves 122d and 124d is a trapezoid, the cross-sectional shape of the accommodating groove 126d is a triangle and the cross-sectional shape of the accommodating groove 128d is arc, such as a semi-circle. In short, the accommodating grooves 122d and 124d are opposite to each other and have the same cross-sectional shape, while the accommodating grooves 126d and 128d are opposite to each other but have different cross-sectional shapes.

In summary, the flexible film of the flexible display apparatus in the invention has the accommodating groove by design, so that the flowing molding compound due to gravity would fill the accommodating groove and the thickness of the molding compound filling the accommodating groove is substantially the same as the thickness of the flexible film. Thus, the molding compound of the invention does not overflow of molding compound on the upper surface of the flexible film and the circumferential surface of the flexible display unit. In short, the flexible display apparatus of the invention can effectively avoid overflow of molding compound caused by the molding compound due to gravity through the design of employing the accommodating groove on the flexible film. Therefore, the appearance of the flexible display apparatus provided by the invention is more flat and nice look.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention. In view of the foregoing, the protective scope of the present invention is given by the following claims and their equivalents.

What is claimed is:

1. A flexible display apparatus, comprising:
a flexible display unit, having a first region and a second region surrounding the first region;
a flexible film, disposed on the flexible display unit and only located within the first region, wherein the flexible film has a circumferential surface and at least one accommodating groove, the accommodating groove is sunken from the circumferential surface, and an orthogonal projection area of a portion of the flexible film on the flexible display unit is smaller than an area of the first region; and
a molding compound, disposed on the flexible display unit and covering the circumferential surface of the flexible film and the second region of the flexible display unit exposed by the flexible film and filling the accommodating groove, wherein the thickness of the molding compound filling the accommodating groove is the same as the thickness of the flexible film, and the molding compound has fluidity,
wherein a viscosity coefficient of the molding compound is proportional to a depth of the accommodating groove, and higher the viscosity coefficient of the molding compound, a deeper a required depth of the accommodating groove is.

2. The flexible display apparatus as claimed in claim 1, wherein a material of the flexible film comprises glass, plastic or metal.

3. The flexible display apparatus as claimed in claim 1, wherein a cross-section of the accommodating groove comprises polygonal shape or arc shape.

4. The flexible display apparatus as claimed in claim 1, wherein a ratio of the area of the accommodating groove over the area of the flexible film ranges roughly from greater than 0 to less than or equal to 0.1.

5. The flexible display apparatus as claimed in claim 1, wherein the number of the at least one accommodating groove is multiple, the accommodating grooves are located at two opposite side edges of the flexible film and orthographic projections of the accommodating grooves on an axis are alternately arranged.

6. The flexible display apparatus as claimed in claim 1, wherein the number of the at least one accommodating groove is multiple, and the accommodating grooves are located at two opposite side edges of the flexible film and orthographic projections of the accommodating grooves on an axis are at least partially overlapped with each other.

7. The flexible display apparatus as claimed in claim 1, wherein an outer profile of the molding compound is a ring-shaped curved-surface profile, the flexible film has an upper surface and a lower surface opposite to each other, the lower surface of the flexible film contacts the flexible display unit, the flexible display has an outer circumferential surface, and the molding compound does not cover the upper surface of the flexible film and the outer circumferential surface of the flexible display unit.

8. The flexible display apparatus as claimed in claim 1, wherein the flexible display unit comprises a flexible liquid crystal display, a flexible electrophoretic display or a flexible organic electroluminescent display.

9. A flexible display apparatus, comprising:
a flexible display unit, having a first region and a second region surrounding the first region;
a flexible film, disposed on the flexible display unit and only located within the first region, wherein the flexible film has a circumferential surface and at least one accommodating groove, the accommodating groove is sunken from the circumferential surface, and an orthogonal projection area of a portion of the flexible film on the flexible display unit is smaller than an area of the first region; and
a molding compound, disposed on the flexible display unit and covering the circumferential surface of the flexible film and the second region of the flexible display unit exposed by the flexible film and filling the accommodating groove, wherein the thickness of the molding compound filling the accommodating groove is the same as the thickness of the flexible film, and the molding compound has fluidity,
wherein the number of the at least one accommodating groove is two, and the accommodating grooves are disposed correspondingly to a bending place of the flexible display apparatus and are opposite to each other.

* * * * *